United States Patent
Fan

(10) Patent No.: US 7,715,057 B2
(45) Date of Patent: May 11, 2010

(54) HIERARCHICAL MINIATURE SECURITY MARKS

(75) Inventor: Zhigang Fan, Webster, NY (US)

(73) Assignee: Xerox Corporation

( * ) Notice: Subject to any disclaimer, the term of this patent is extended or adjusted under 35 U.S.C. 154(b) by 755 days.

(21) Appl. No.: 11/472,695

(22) Filed: Jun. 22, 2006

(65) Prior Publication Data

US 2007/0297012 A1    Dec. 27, 2007

(51) Int. Cl.
     *H04N 1/40*      (2006.01)
     *H04N 1/60*      (2006.01)

(52) U.S. Cl. ........................ 358/3.28; 358/1.9

(58) Field of Classification Search ............... 358/3.28, 358/1.9, 2.1, 2.99, 3.01, 3.02, 3.03, 3.04, 358/3.05, 3.06, 3.07, 3.08, 3.09, 3.1, 3.11, 358/3.12, 3.13, 3.14, 3.15, 3.16, 3.17, 3.18, 358/3.19, 3.2, 3.21, 3.22, 3.23, 3.24, 3.26, 358/3.27, 3.3, 530, 534, 535, 536, 448, 465, 358/466, 1.14, 1.15, 437; 382/100, 237, 382/270, 308; 345/596, 597, 598, 599; 347/2, 347/3, 5, 14, 23; 380/243, 246, 245, 244, 380/55

See application file for complete search history.

(56) References Cited

U.S. PATENT DOCUMENTS

| | | | |
|---|---|---|---|
| 6,603,576 B1 * | 8/2003 | Nakamura et al. | ......... 358/3.28 |
| 6,694,042 B2 | 2/2004 | Seder et al. | |
| 7,002,704 B1 | 2/2006 | Fan | |
| 2007/0138283 A1 | 6/2007 | Dymetman et al. | |
| 2007/0158434 A1 | 7/2007 | Fan | |

FOREIGN PATENT DOCUMENTS

| | | |
|---|---|---|
| EP | 0 917 113 B | 8/2004 |
| EP | 1 059 800 B | 11/2005 |

OTHER PUBLICATIONS

U.S. Appl. No. 11/317,768, filed Dec. 23, 2005, Fan.
U.S. Appl. No. 11/312,057, filed Dec. 20, 2005, Dymetman, et al.
*Digital Watermarks: The Interaction of Digital Watermarking and Copyright Law*—WebReference.com, http://www.webreference.com/content/watermarks/interaction.html (1998).
*Digital Watermarks:Conclusion*—WebReference.com, http://www.webreference.com/content/watermarks/conclusion.html (1998).

(Continued)

*Primary Examiner*—Dov Popovici
(74) *Attorney, Agent, or Firm*—Fay Sharpe LLP

(57) ABSTRACT

A system for generating a security mark includes a data reception component that receives information. A security mark generation component in communication with the data reception component generates at least one security mark configuration based at least in part upon the received information. The at least one security mark configuration includes a plurality of marks. An application component applies one configuration of the at least one security mark configurations to a recipient. The applied security mark configuration obeys a predetermined set of rules which include at least one rule which defines a spatial relationship between a first group of the plurality of marks and a second group of the plurality of marks.

26 Claims, 6 Drawing Sheets

OTHER PUBLICATIONS

J.Zhao, *Digital Watermarking is the Best Way to Protect Intellectual Property from Illicit Copying*, http://www.byte.com/art/9701/sec18/art1.htm Jan. 1997.

*Watermarks: Secret Code for Protection*, http://www.byte.com/art/9701/img/017ifla2.htm.

*Digital Watermarking—Wikipedia, the free encyclopedia*, http://en.wikipedia.org/wiki/Digital_watermarking.

*Digital Watermark*, http://www.webopedia.com/TERM/D/digital_watermark.html.

D.Isenberg, *Digital Watermarks: New Tools for Copyright Owners and Webmasters*, http://www.webreference.com/content/watermarks/.

*Digital Watermarking and Tracking*, http://www.webreference.com/content/watermarks/tracking.html.

*Digital Watermark*, http://www.yourwindow.to/information-security/gl_digitalwatermark.htm.

H.Berghel, L.O'Gorman, *Digital Watermarking*, http://www.acm.org/~hlb/publications/dig_wtr/dig_watr.html, (1997).

F.Perez-Gonzalez, J.R.Hernandez, *A Tutorial on Digital Watermarking*, http://64.233.161.104/search?g=cache:khnQ2y7zZSEJ:www.gts.tsc.uvigo.es/gpsc/publication .

S.Theodoridis, et al., *Pattern Recognition, Passage, Pattern Recognition*, XP-002405837, San Diego, CA: Academic Press, pp. 238-241, Jan. 1, 1999.

*Digital Watermarks: The Interaction of Digital Watermarking and Copyright Law*—WebReference.com, http://www.webreference.com/content/watermarks/interaction.html (1998).

*Digital Watermarks:Conclusion*—WebReference.com, http://www.webreference.com/content/watermarks/conclusion.html (1998).

J.Zhao, *Digital Watermarking is the Best Way to Protect Intellectual Property from Illicit Copying*, http://www.byte.com/art/9701/sec18/art1.htm Jan. 1997.

*Watermarks: Secret Code for Protection*, http://www.byte.com/art/9701/img/017ifla2.htm. downloaded Dec. 15, 2005.

*Digital Watermarking—Wikipedia, the free encyclopedia*, http://en.wikipedia.org/wiki/Digital_watermarking downloaded Dec. 15, 2005.

*Digital Watermark*, http://www.webopedia.com/TERM/D/digital_watermark.html. Oct. 27, 2003.

D.Isenberg, *Digital Watermarks: New Tools for Copyright Owners and Webmasters*, http://www.webreference.com/content/watermarks/. Jan. 20, 1998.

*Digital Watermarking and Tracking*, http://www.webreference.com/content/watermarks/tracking.html. Jan. 20, 1998.

*Digital Watermark*, http://www.yourwindow.to/information-security/gl_digitalwatermark.htm. downloaded Dec. 15, 2005.

H.Berghel, L.O'Gorman, *Digital Watermarking*, http://www.acm.org/~hlb/publications/dig_wtr/dig_watr.html, (1997).

F.Perez-Gonzalez, J.R.Hernandez, *A Tutorial on Digital Watermarking*, http://64.233.161.104/search?g=cache:khnQ2y7zZSEJ:www.gts.tsc.uvigo.es/gpsc/publication, Oct. 5, 1999.

* cited by examiner

HIERARCHICAL MINIATURE SECURITY MARKS

CROSS REFERENCE TO RELATED PATENTS AND APPLICATIONS

Cross-reference is made to the following co-pending application, the disclosure of which is incorporated herein by reference in its entirety:

U.S. application Ser. No. 11/317,768, filed Dec. 23, 2005, entitled COUNTERFEIT PREVENTION USING MINIATURE SECURITY MARKS, by Zhigang Fan.

BACKGROUND

The exemplary embodiment relates to the digital imaging arts. It finds particular application in conjunction with a method and apparatus for utilizing miniature security marks for watermarking documents and may be used to distinguish authentic documents from counterfeit documents.

Machine readable information in the form of watermarks, barcodes, and the like has been embedded into images on paper for a variety of applications, such as document identification and authenticity verification. The code is generally invisible or visually unobstructive and may be decoded by a device which is capable of reading the information. Current counterfeit prevention systems are frequently based on the use of digital watermarks. Digital watermarking is a technique which allows a user to add information (e.g., copyright notices, security codes, identification data, etc.) to digital image signals and documents. Such data can be in a group of bits describing information pertaining to the signal or to the author of the signal (e.g., name, place, etc.). Most common watermarking methods for images work in spatial or frequency domains.

For spatial digital watermarking, the simplest method involves flipping the lowest-order bit of chosen pixels in a gray scale or color image. This tends to work well only if the image will not be subject to any human or noisy modification. A more robust watermark can be embedded in an image in the same way that a watermark is added to paper. Such techniques may superimpose a watermark symbol over an area of the picture and then add some fixed intensity value for the watermark to the varied pixel values of the image. The resulting watermark may be visible or invisible depending upon the value (large or small, respectively) of the watermark intensity.

Spatial watermarking can also be applied using color separation. In this way, the watermark appears in only one of the color separations. This renders the watermark visibly subtle such that it is difficult to detect under regular viewing. There are several drawbacks to utilizing digital watermarking technology. To retrieve a watermark, extraction hardware and/or software is generally employed. As the digital watermarks usually have fairly large footprints, detectors employed to read the digital watermarks often require significant buffering storage. Consequently, this increases the detection costs, particularly if the watermark extraction is implemented in hardware.

There remains a need for alternative systems and methods to provide watermarking techniques for identification of images and/or documents, for uses such as prevention of counterfeiting.

INCORPORATION BY REFERENCE

The following references, the disclosures of which are incorporated herein by reference in their entireties, are mentioned:

U.S. Pat. No. 7,002,704, entitled "METHOD AND APPARATUS FOR IMPLEMENTING ANTI-COUNTERFEITING MEASURES IN PERSONAL COMPUTER-BASED DIGITAL COLOR PRINTERS," by Zhigang Fan discloses a system for rendering an electronic image representation associated with a software application program. The system includes a host processor programmed to execute the software application program, a temporary storage device associated with the host processor, a printer interfaced to the host processor, and a software program operative on the host processor for determining whether the electronic image representation is of a predetermined document type by examining at least a portion of the electronic image representation when stored in the temporary storage device during the course of printing the electronic image representation at the printer.

U.S. Pat. No. 6,694,042, entitled "METHODS FOR DETERMINING CONTENTS OF MEDIA," by Seder, et al. discloses printing documents and other objects with machine readable indicia, such as steganographic digital watermarks or barcodes, for enabling document management functions. The indicia can be added as part of the printing process, such as by printer driver software, by a Postscript engine in a printer. The indicia can encode data about the document, or can encode an identifier that references a database record containing such data. By showing the printed document to a computer device with a suitable optical input device (e.g., a webcam), an electronic version of the document can be recalled for editing, or other responsive action can be taken.

U.S. application Ser. No. 11/317,768 discloses a system which applies a security mark to a recipient, such as an image or document. A data reception component receives information from one or more sources. A security mark generation component generates at least one miniature security mark (MSM) configuration based at least in part upon the information from the data reception component. An application component applies the at least one MSM configuration to one or more recipients.

BRIEF DESCRIPTION

In one aspect of the exemplary embodiment disclosed herein, a system for generating a security mark includes a data reception component that receives information. A security mark generation component, in communication with the data reception component, generates at least one security mark configuration based at least in part upon the received information. The at least one security mark configuration includes a plurality of marks. An application component applies one configuration of the at least one security mark configurations to a recipient, the applied security mark configuration obeying a predetermined set of rules which include at least one rule which defines a spatial relationship between a first group of the plurality of marks and a second group of the plurality of marks.

In another aspect, a method for applying a security mark to a recipient includes generating at least one security mark configuration representative of information to be applied to a recipient. The at least one security mark configuration includes a plurality of marks which obey rules which provide a limited flexibility in the positioning of groups of the marks. One configuration of the at least one security mark configurations is applied to a recipient.

In another aspect, a recipient includes an image and a machine readable security mark embedded therein. The security mark includes a collection of miniature marks including a plurality of groups of marks. The groups of marks each include marks which obey predefined intra-group spatial relationships. The groups of marks obey at least one predefined inter-group spatial relationship which permits a limited number of different spatial configurations of the groups of marks.

In another aspect, a method for detecting a security mark includes inputting image data, processing at least a portion of the image data to identify a collection of marks which potentially comprises a security mark, subjecting the image data to a predetermined set of rules for the security mark including at least one rule which defines a spatial relationship between first and second groups of marks in a collection of the marks, and where the image data meets the predetermined set of rules, optionally implementing a computer implemented process.

In another aspect, a system for detection of security marks includes a detection component for generating a signal representative of image data, an extraction component for extracting from the image data a security mark where present. The security mark includes a collection of marks. An interpretation component interprets the extracted security mark. The interpretation component interprets a plurality of different configurations of the security mark in the same manner. Each of the configurations obeys a predetermined set of rules which define spatial relationships between marks in first and second groups of the marks and at least one spatial relationship between the first and second groups of the marks. Optionally, an implementation component is provided for implementing a computer implemented process in accordance with the interpretation.

DETAILED DESCRIPTION

Figure 1:
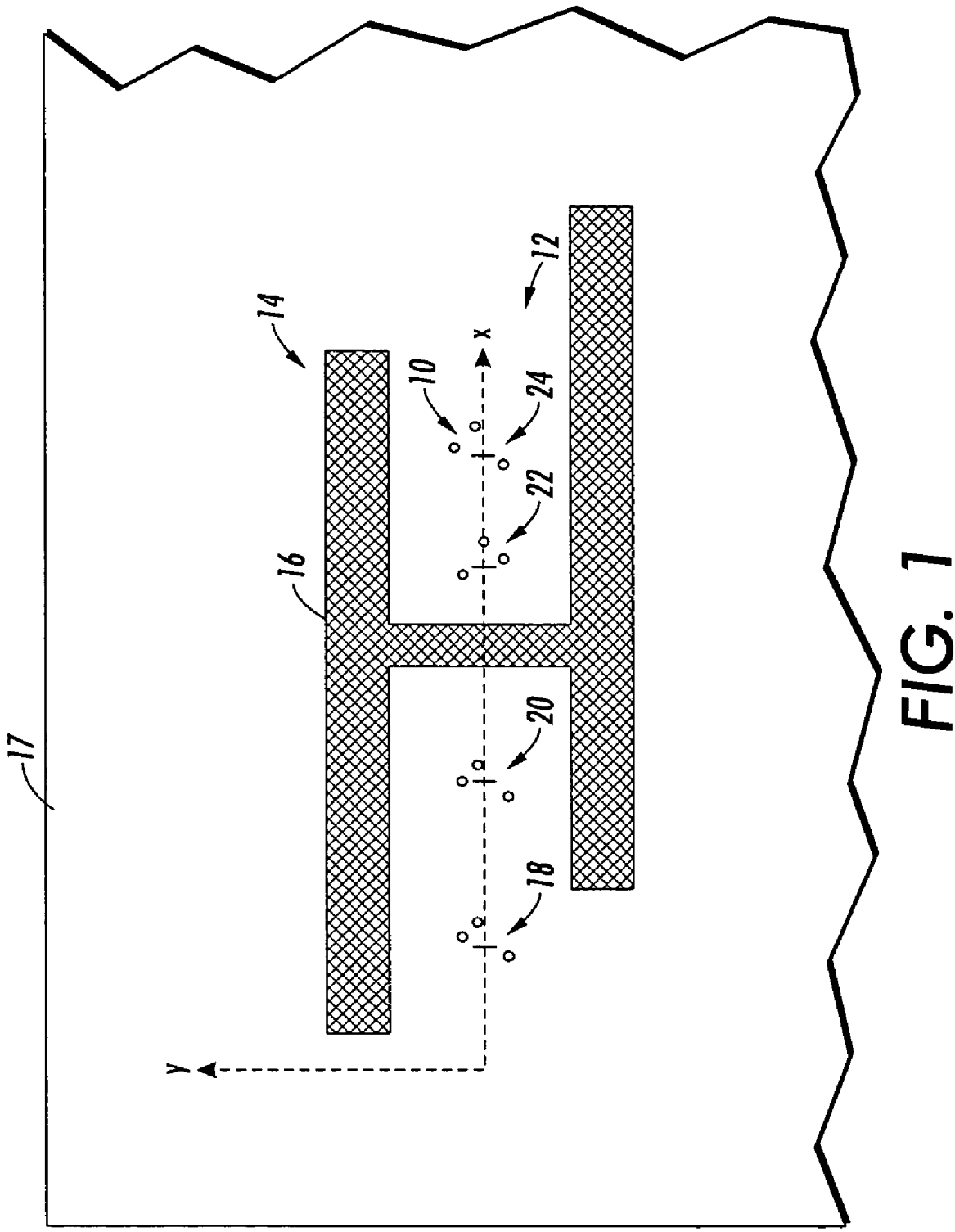
FIG. 1 is a greatly enlarged top view of a security mark proximate a visible character on a recipient, according to the exemplary embodiment.

U.S. application Ser. No. 11/317,768, incorporated by reference, discloses a system which applies a miniature security mark (MSM) to a recipient, such as a digital image or a rendered image. The MSM is a collection of small, virtually invisible marks having a particular configuration. Such marks have an advantage in that they can be embedded in paper documents that are to be protected (e.g., currency notes) and detected with relatively simple detection techniques. Such detection techniques are thus amenable to use with printing systems with little associated processing capability, such as printers designed specifically for printing camera images by a simple link to the camera or memory card, without requiring access to a stand alone personal computer.

The detection rate of these miniature security marks (MSM's) tends to increase as the number of marks in the collection increases. Where only a limited number of marks is used, false alarm rates tend to increase. For example, 10-15 marks may be used for accurate detection. Additionally, if the marks making up the MSM are placed too close together, they may become visible to the naked eye, which may be undesirable for some applications. These two factors can thus place a constraint on the minimum area occupied by the MSM. Moreover, if the marks comprising the MSM are too close to an edge of the host image, the edge may interfere with detection. The techniques described in application Ser. No. 11/317,768 are particularly suited to use in fairly large, smooth (low contrast) regions of an image.

The present exemplary embodiment builds on the features of U.S. application Ser. No. 11/317,768. In one embodiment, the collection of marks forming an MSM has a hierarchical structure (a "hierarchical miniature security mark" or HMSM) in which the collection comprises groups of marks whose relative positions and orientations are specified by a set of rules. The exemplary embodiment allows high accuracy in detection of the HMSM, even when the HMSM includes a relatively few marks or is located in or adjacent to a relatively high contrast area of an image, such as an edge or a visible character. For example, a group of marks in the HMSM may be spaced from a second group of the marks by a visible character or portion thereof which does not form a part of the HMSM. The rules specifying the inter-group relationships allow the two groups to be identified as part of the HMSM.

In various aspects, a system for generating a security mark includes a data reception component which receives information. A security mark generation component generates at least one security mark configuration based at least in part upon the information from the data reception component. The security mark configuration obeys a predetermined set of rules for a hierarchical security mark comprising a collection of marks, including at least one rule which defines a relationship between first and second groups of marks. An application component applies the at least one security mark configuration to one or more recipients. The security mark generation component may select from a plurality of configurations which obey the set of rules, a configuration which meets predetermined selection criteria. The criteria may be defined to output a suitable configuration which can be incorporated into an image such that each group of marks is located in a region which provides sufficient contrast for the marks in the group to be subsequently detectable.

In other aspects, a method for generating a security mark includes applying a collection of marks to a recipient, the collection of marks including groups of marks which obey predefined inter-group and intra-group spatial relationships. The inter-group spatial relationships permit a limited number of different configurations which provides flexibility in the positioning of the groups of marks.

In another aspect, a system for detection of security marks includes means for extracting a security mark as described herein from a recipient in which it has been embedded and interpreting the mark and optionally for implementing a computer implemented process based on the interpretation.

In another aspect of the exemplary embodiment, a method for detecting a security mark includes inputting image data, processing at least a portion of the image data to identify a collection of marks which potentially comprises a security mark, subjecting the image data to a predetermined set of rules for the security mark including at least one rule which defines a relationship between first and second groups of marks, and, where the image data meets the predetermined set of rules, optionally implementing a computer implemented process.

In yet another aspect, a computer readable medium includes instructions, which, when executed on a processor, causes the processor to perform the embedding and/or detection method.

The inputting of image data may include inputting stored image data from an image data file or scanning a physical document to generate the image data for an image rendered on the document.

Security marks are considered to be machine readable if techniques are available for automatically obtaining information from signals that include information about the marks. Security marks are considered to be visible if humans generally perceive the marks with an unaided eye.

A security mark, as used herein can be any mark (e.g., depression, impression, raised, overlay, combination thereof, or the like) that is applied to a recipient. The recipient may be a digital image, such as a graphic, a picture, a body of text, or a physical instantiation of such an image, such as a physical document formed on a physical medium. The physical document can be formed by marking the physical medium, such as a physical sheet of paper, plastic, velum, glass, or other suitable physical print media substrate for images, with a marking material, such as ink or toner, generally referred to as printing. The security mark may be applied in the same or a different process from that used to form an image. The document may be rendered on a single sheet or multiple sheets by a standard office printer (e.g., ink-jet, laser, etc.) or a large clustered on-demand document printer. In general, a physical recipient can comprise any material upon which a security mark can be placed and subsequently detected and extracted.

As used herein, an MSM is a security mark which comprises a collection of marks which obey a predetermined set of rules governing relationships between marks in the collection. The marks in the collection are generally miniature marks, i.e., marks of a size which while being capable of being machine readable, are too small to be visible. For example, the individual marks in the collection may have a size of between about 1 micrometer and several hundred micrometers, and sufficiently spaced from each other such that they are virtually invisible to the naked eye A hierarchical MSM (an HMSM) is an MSM in which groups of marks obey a predetermined set of rules governing relationships between groups in the collection.

By showing a printed document to a computer device with a suitable associated optical input device, the machine-readable information provided by the MSM is decoded, and used to invoke a computer implemented process. The computer implemented process may be any suitable process which is implemented automatically as a result of the detection of an HMSM or the detection of an absence of an HMSM. For example, the computer implemented process may include permitting/prohibiting copying of the recipient in which the HMSM is detected/not detected, alerting a user by a signal, such as a visible or audible signal, that a recipient can/cannot be copied or advising the user of some other action which should be taken, preventing removal/destruction or otherwise preventing access to the recipient or reuse of the recipient in which the HMSM was detected/not detected, or other computer implemented processes.

In some cases, verification of authenticity of the one or more products is of interest to a user. In order to provide a means to verify authenticity, one or more security marks can be placed on the product. Such security marks can be detected and extracted at a later time for verification purposes. For example, the security mark can contain information that can be detected, extracted and/or interpreted. Such information can be employed, for example, to prevent counterfeiting by verifying that the information contained within the security mark is accurate. The information can be used to verify the authenticity of the recipient to which the security mark is applied. The information may be contained in the mark by virtue of the configuration of the miniature marks in the collection which may be associated, e.g., in memory, with particular information from which the MSM is derived.

The marks in the MSM generally serve two purposes: (1) identification of the collection of marks as a security mark, and (2) providing information, such as information about the recipient which the security mark protects. In one embodiment, all of the marks in the collection are used for both purposes. In other embodiments, selected one(s) of the marks are used for only one of the purposes. In yet further embodiments, specific aspects of the marks and/or their configuration are used for one or both of these purposes.

In the exemplary embodiment, an HMSM is a security mark which comprises a collection of marks (typically miniature marks) with a hierarchical structure. The hierarchical structure may include at least two levels, although more than two levels may be employed, such as three or more levels. At a first level (the top level in the exemplary embodiment) spatial relationships (the relative positions and/or orientations) between a plurality of groups of marks are defined, each of the groups of marks comprising a plurality of marks. The spatial relationships of the groups of marks may be defined by a first set of rules. At a second level of the hierarchy (the bottom level in the exemplary embodiment), spatial relationships between marks within each group are defined. This enables a flexible structure that can fit many different image contexts. In genera, the flexibility is provided by the first level rules.

For example, the second level rules may constrain the marks within each group to fixed spatial relationships with the other marks in the group. Thus, each group of marks in the HMSM may have an identical spatial configuration, e.g., in terms of its size and shape, although its orientation in space may be rotated, as compared with other groups. The first level rules may permit a plurality of different configurations of the groups of marks, from which a particular configuration which best fits the intended recipient may be selected. For example, the first level rules may permit a least two, and in some embodiments, three, four, five, six or more different configurations. The configurations may include configurations in which the groups are arranged generally along the same axis and configurations in which two or more groups are aligned generally with a second axis spaced from the first axis (such as in a triangle, square, rectangle, diamond, or other polygonal arrangement). In some configurations, some groups may be spaced from other groups by different spacings. The rules thus accommodate different configurations which permit one or more groups to be spaced from another group or groups by a part of the image.

In general, first level spatial rules define inter-group spatial relationships. For example, first level spatial rules may specify one or more of:

a. an orientation of one or more groups of marks from another group of marks. For example, first and second groups of marks may be oriented at an angle θ to a fixed direction, such as horizontal, or to another group.

b. the relative positions of groups. For example each group may be distance from at least one other group (e.g., the proximate group(s)) or from a fixed reference point, such as from an edge of the recipient, the distance being defined by one or more distance rules, such as a fixed distance or a relative distance with respect to first and second directions.

For example, the spacing (distance) between proximate groups may be expressed as a function of a fixed distance, such as kn where k is a variable multiplier and may be an integer which can assume any value between maximum and minimum values and n may be a fixed number of pixels, such as 10, 20, or 50 pixels. The spacing may be defined in mutually perpendicular directions (x and y), such as cross process and process directions in an image to be printed.

In determining whether groups are at the same orientation, the group as a whole may be considered, rather than an individual mark in each group. Alternatively orientation may be considered with respect to one (or more) of the marks in each group. Similarly, in determining whether groups have the same relative positions, the group as a whole may be considered, such as its center, rather than an individual mark in each group. The center of a group may be defined in a variety of ways, depending on the arrangement of marks in the group. For example, the center of a group which occupies corners of a triangle may be located at the intersection of lines joining the midpoints of the sides with opposite corners. For less regular shapes, the weighted center of all marks may be taken as the center. Alternatively relative positions of two groups may be considered with respect to one (or more) of the marks in each group.

In general, the distance rules may be specified to avoid having two groups overlapping each other. Groups overlap when one or more marks of a first group fall within a perimeter of the marks forming another group. By avoiding overlap, each group can be readily identified by the detecting system. For example, group centers, or selected reference marks within the groups may be at least a minimum distance from each other so as to avoid a mark of a first group falling within a perimeter defined by the marks of a second group in all of the permitted configurations. In one embodiment centers of the groups are spaced by a distance which exceeds a distance between any pair of marks in the group, or exceeds a distance between any mark of a group and the center of the group, e.g., by a factor of at least two.

First level rules may also include other rules, such as rules which place numerical limitations, e.g.:
  a. a minimum and/or maximum or specified number of groups constituting the collection (e.g., "at least three groups" or "exactly four groups").
  b. a minimum and/or maximum or specified number of the groups which obey a particular first/second level rule or set of first/second level rules (e.g., "all groups to obey all second level rules," "three of four groups to obey type 1 first level rules and fourth group to obey type 2 of first level rules").

In general, second level spatial rules, i.e., rules for a group of marks define intra-group spatial relationships. For example, second level rules may specify one or more spatial relationships selected from:
  a. an orientation of marks which form the group of marks. For example, first and second marks may be oriented at an angle α to a third mark. In a second group having the same intra-group orientation, the same angle α is used between three corresponding marks.
  b. relative positions of marks. For example, a distance between the first mark and the third mark of a group may be equal to (or some other fixed relationship to) a distance between the second mark and the third mark or between second and fourth marks.

The second level rules may also specify other features of the marks, such as:
  a. a minimum and/or maximum number of marks in a group or a fixed number of marks.
  b. a minimum and/or maximum size of marks in the group or a fixed size.
  c. an attribute of the marks, e.g., a color (or gray level) or size of one or more marks in the group or a fixed attribute for all marks in the group.

Thus, in various embodiments, the rules may require that all of the groups forming the collection have the same set of intra-group relationships to the other groups of marks. In other embodiments, fewer than all the groups of marks have the same intra-group relationship to each other. For example, a rule may specify that a certain specific number of groups or a predefined minimum and/or maximum number of the groups forming the collection obey the same set of intra-group relationships. Additionally, between groups of marks, the groups in the collection may all have the same set of inter-group relationships or one or more groups in the collection of marks may have a different inter-group relationship. Thus the configuration of the marks for each group may or may not be identical. The rules governing a particular hierarchical security mark define which inter-group and intra-group relationships must be obeyed for the collection to be identified as a HMSM of that particular configuration.

In one embodiment, each of a plurality of groups of marks in the collection includes at least three marks. In one embodiment, at least a first of the groups of marks includes N marks which have the same spatial relationship to each other (i.e., obey the same set of second level spatial relationship rules) as N marks of a second of the groups of marks, where N is an integer which is at least 2 and can be for example, 3, 4, or 5, etc. In general, N is less than 20, e.g., less than 10. In one embodiment, at least P groups of marks have N marks which obey the same set of second level spatial relationship rules, where P is an integer which is at least 2, and can be, for example, 3, 4, 5, or 6, etc. In general, P is less than 20, e.g., less than 10. In one embodiment, at least R of the P groups obey the same set of inter-group rules, where R is an integer which is at least 2 and can be up to P. In one embodiment, at least nine miniature security marks form an HMSM such as from about 9 to 30 miniature marks, and in one embodiment, about 12-20 miniature marks, which may be in at least three groups.

In detection, to identify an MSM, each group is identified. Additionally, the relative positions and orientations of the groups are determined to establish whether the rules specified are established. To design the rules that specify the relative orientations and positions among the groups, two considerations are helpful. First, particularly where host images may differ, the rules should provide sufficient flexibility to enable the resulting MSMs to take different configurations that fit into the context of the host image. Second, the rules should also provide enough discriminating power so that the detection errors are within acceptable levels.

With reference to FIG. 1, an exemplary security mark 10 in the form of a HMSM is illustrated. The security mark 10 is located in an area 12 of an image 14 which is determined to be of an acceptable level of image smoothness for detection of the security mark. Areas of the image considered too dark (i.e., providing insufficient contrast with the marks to permit detection or which are otherwise unsuitable for location of the security marks) are indicated by the hatched area 16. For example, area 12 may be a white background area or an area of low contrast, whereas area 16 may be a portion of text in the image. The security mark 10 may be embedded in the image 14 and may be physically embodied on a suitable recipient, e.g., a substrate 17, such as paper. The illustrated substrate 17 can be employed within a particular product, such as a document, e.g., a title, a license, a visa, a passport, a bill of currency, a check, or the like. In addition, although a single security mark 10 is illustrated, a plurality of security marks can be applied in substantially any location on the recipient.

Figure 4:
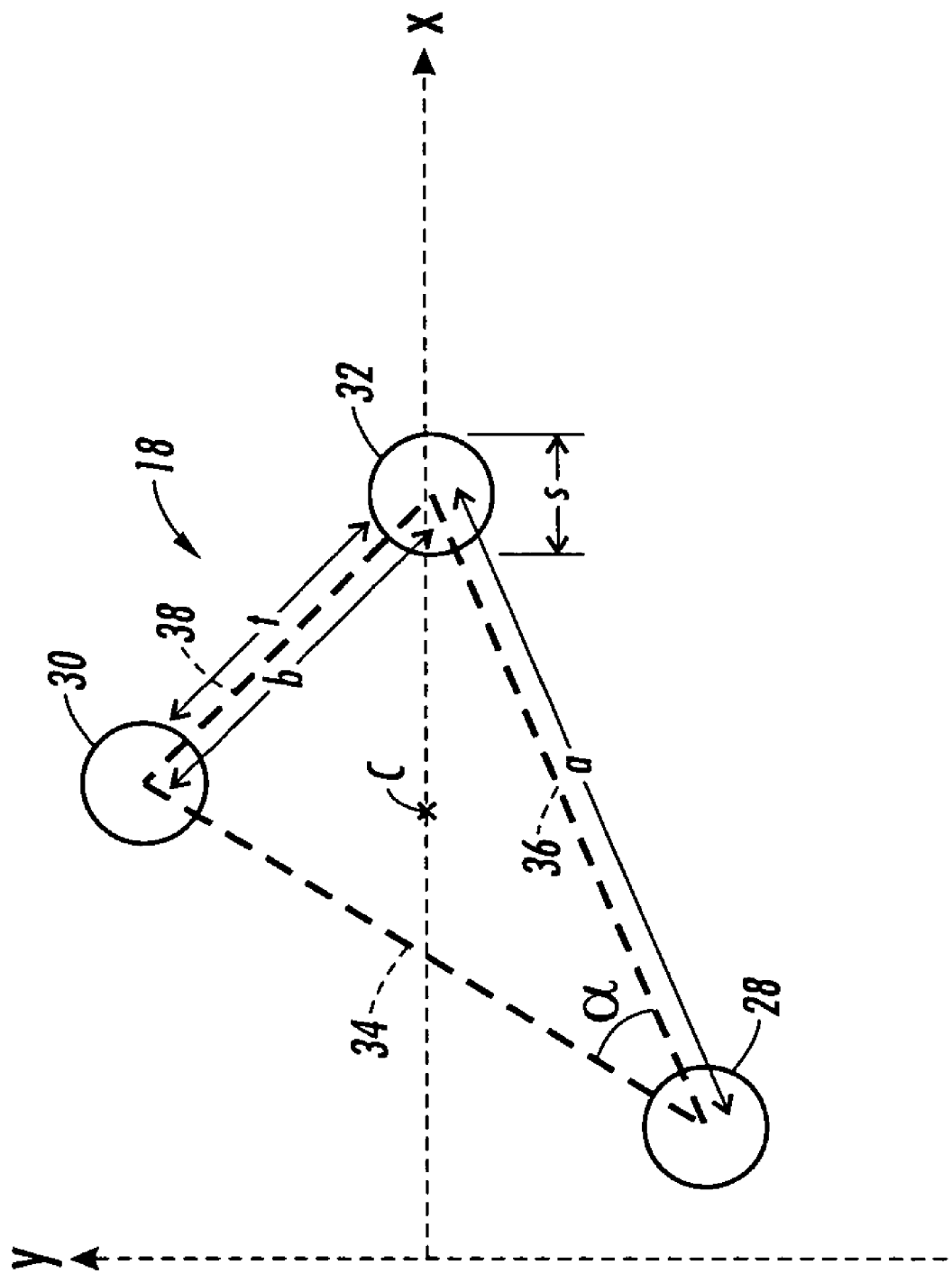
FIG. 4 is a further enlarged view of a portion of the security mark of FIG. 1.

The illustrated security mark 10 includes a plurality of groups of marks, four groups 18, 20, 22, 24 of marks in the illustrated embodiment, i.e., P=4, each comprising a subset of the marks, e.g., three marks 28, 30, 32, i.e., N=3 as best shown in FIG. 4. The marks 28, 30, 32 in each group have an identical configuration (specified by second level rules). Specifically, as shown in FIG. 4, which shows group 18 by way of example, the marks in each group are arranged at corners of an imaginary triangle with a geometric center C and having two sides 34, 36 of equal length a which subtend an angle $\alpha$ and a third side 38 of length b. The intra-group configuration of the marks in a group 18 ignores the orientation of the group of marks in space. The marks locations are determined by a set of rules which provide a limited flexibility in the relative positioning of the groups of marks.

In FIGS. 1-4, each mark 28, 30, 32 in the collection is represented by an unfilled circle of the same size although it will be appreciated that the marks may have different shapes. For example, the marks can be circles, ellipses, regular polyhedral, such as triangles squares, or the like and can have substantially any color outline and/or fill. In one embodiment, one or more of the marks has a different color, size, and/or shape or other distinguishable feature from other marks in the collection. In general, the marks have a size s (expressed in terms of its maximum diameter) which is less than one half of a distance between centers of two most closely adjacent marks in a group such that the space between two marks t exceeds the size s of a mark by a factor of, for example, at least 2 (t≧2s).

Figure 2:
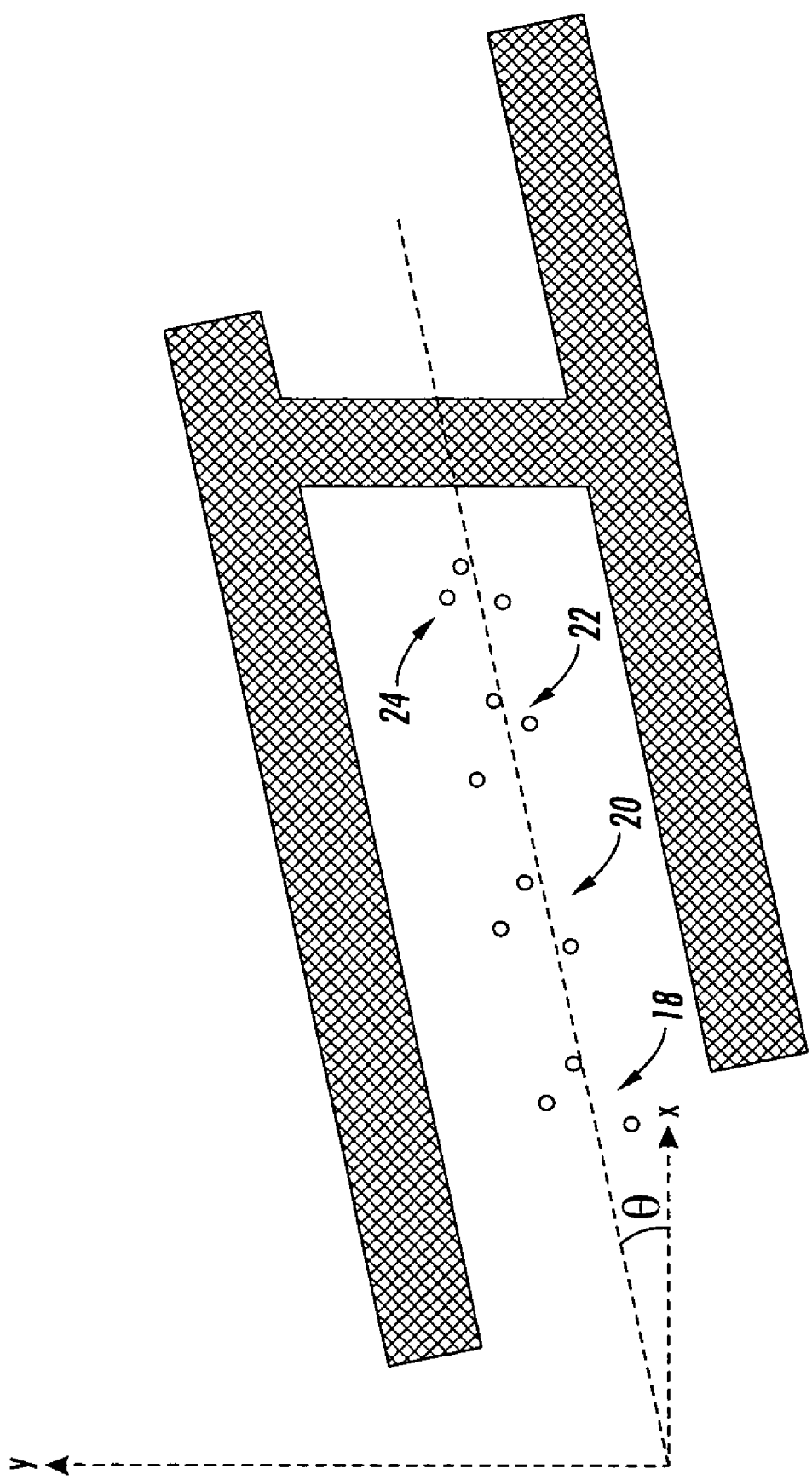
FIGS. 2 and 3 are greatly enlarged illustrations of other exemplary security marks proximate a visible character.
Figure 3:
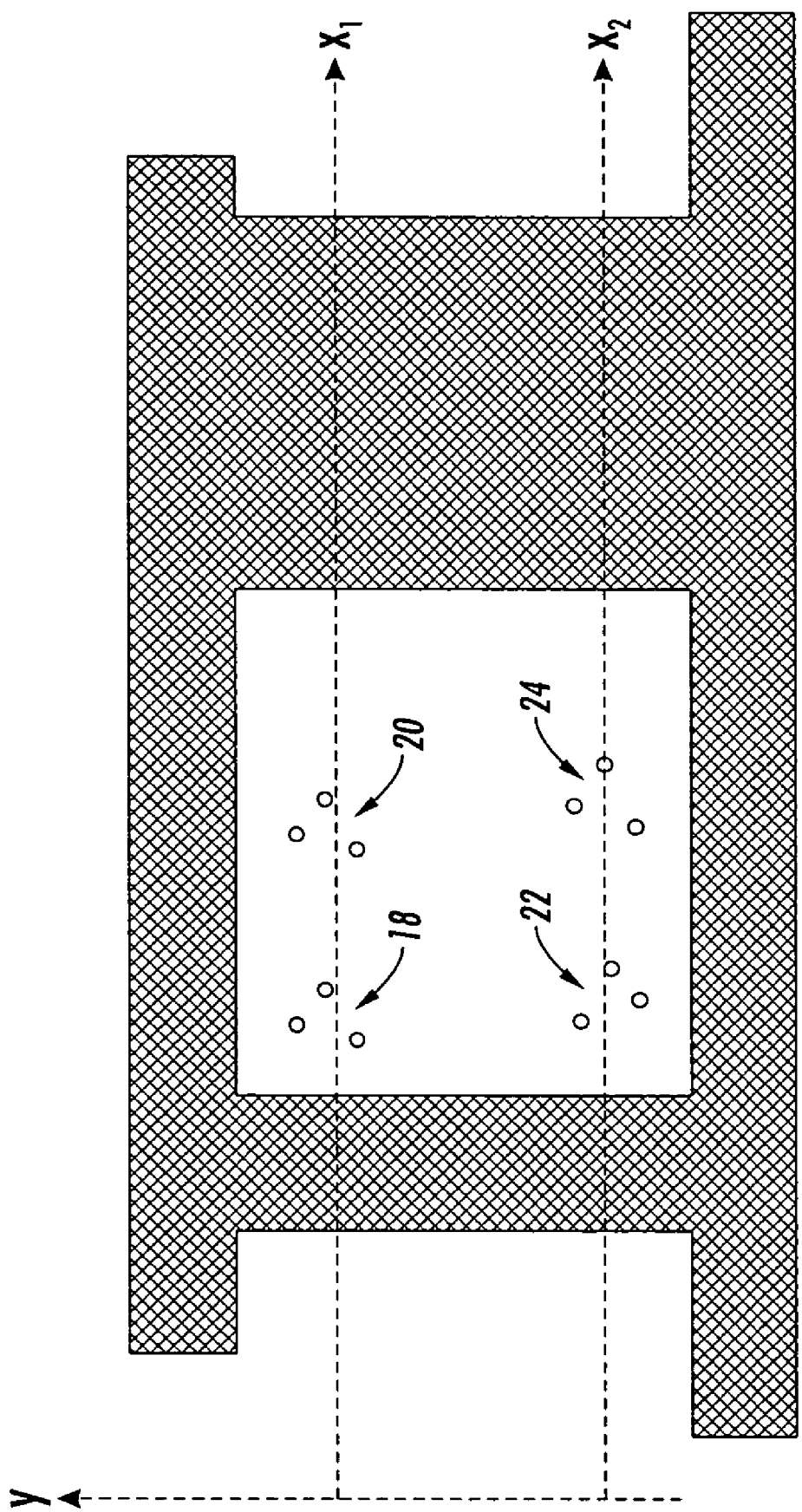

In the case of the security mark 10 illustrated in three different permitted configurations in FIGS. 1-3, the orientation and relative position of the groups (first level rules) are specified by the first level rules as:

1) all the groups have the same orientation $\theta$, except one at $\theta+90°$ (i.e. R=3);
2) the relative positions of the groups are constrained as:
   $\Delta x=30$ k (pixels) and
   $\Delta y=30$ m (pixels), where $\Delta x$ and $\Delta y$ are the relative shifts between two group centers in direction of $\theta$ and $\theta+90°$, respectively,
   where k and m are integers (including 0) such that $|k|<6$ and $|m|<6$ and at least one of $|k|$ and $|m|$ is non zero.

The first level rules in this example are defined such that no group overlaps a second group, e.g., by ensuring at least one of $\Delta x$ and $\Delta y$ exceeds the projection of the group $\Delta x_g$ and $\Delta y_g$ in the respective direction $\theta$ and $\theta+90°$. In this way, no two groups in the HMSM are overlapping (fall within the same perimeter) and are readily distinguished as a group. Another way to distinguish groups is to specify that, in all cases, a minimum distance between a mark of a first group and a mark of a second group is greater than a maximum distance between two marks within the same group.

In the configuration illustrated in FIG. 1, $\theta=0$, i.e., the axis of the groups is aligned with horizontal (x direction) and $\Delta y=0$. Other configurations also satisfy these rules. For example, the configurations of FIGS. 2 and 3 also represent HMSMs according to the above specification. The flexible configuration makes them readily fit to the different image contents. For example, in FIG. 2, direction $\theta$ is about 30° from the x axis. In FIG. 3, $\theta$ is aligned with horizontal (x direction) and m=0, k>0 for the spatial relationship between pairs of groups 18, 20 and 22, 24 and m=>0, k=0 for the spatial relationship between pairs of groups 18, 22 and 20, 24. A first pair of groups 18, 20 is thus aligned with a first axis $x_1$ and a second pair of groups 22, 24 is thus aligned with a second axis $x_2$. Axis $x_1$ is spaced from and parallel with axis $x_2$.

It will be appreciated that rules for detection of the security mark may specify latitude limits within which the above rules are considered to be obeyed. For example, a rule which specifies:

$\Delta x=30$ k (pixels)

may be considered to be satisfied, for example, where the detected $\Delta x=30$ k (pixels)$\pm\delta$ where $\delta$ can be, for example, no more than 5 pixels. The value of the latitude limit $\delta$ selected may depend on the capabilities of the MSM detection system and on the degree of tolerance for false positives, as well as the accuracy of the rendering device and/or the smoothness of the substrate on which the HMSM is rendered.

Other first level rules which are specified include: P=4

The second level rules, in the illustrated embodiment specify:
a. First and second marks are oriented at an angle 60 to a third mark in which $\alpha=30°$.
b. a=12 pixels.
c. N=3 (N<4, N>2)
d. All marks have the same attributes: marks are identical in size, shape, and color: 3 pixels in diameter and are unfilled black circles.

As with first level rules, some of the second level rules, such as the attributes and values of a and $\alpha$ may have an associated latitude limit for detection, although in general, the value of N is not permitted to vary within latitude limits.

A collection of marks which simultaneously satisfies all the preselected rules for a given hierarchical security mark (i.e., within the predefined latitude limits) is recognized as an acceptable configuration of the hierarchical security mark.

Some of the marks in the HMSM may be anchor marks, as described in U.S. application Ser. No. 11/317,768. However, as each group is relatively small, the anchor marks, which enable a reduction in the overall computation, are not generally necessary. The anchor marks, where present, may provide two reference points for the MSM configuration. Such reference points allow data to be extracted regardless of the scale, orientation, truncation, image degradation, or the like of the security mark. Thus, systems employed to extract data from the security mark are not dependent on a perfect, properly oriented security mark in order to extract data contained therein. As a result, recipient handling does not have to be constrained. The anchor marks may have a different size, shape, color, or other distinguishable feature from the remaining marks ("data marks"). The anchor marks may be in the same group or in different groups. In one aspect, a security mark has a MSM configuration that includes at least one data mark per group and at least one anchor mark per group. The marks may have different colors and/or shapes. In particular, the anchor marks within an MSM configuration have at least one attribute (e.g., size, shape, color, etc.) that is different from the data mark(s) in the group. In general, no anchor mark can have all the same attributes of any data mark.

The hierarchical structure described above finds application in the protection of documents, such as counterfeit protection. It can also be applied to general digital watermarking. Conventionally, certain regions in an image are considered to be not suitable for embedding digital watermarks. For example, totally white regions tend to be difficult to hide watermarking noise. Very dark regions tend to make watermarks more difficult to survive the printing/scanning process. By decomposing a digital watermark of large size into several smaller sub-watermarks, these problems are more readily overcome. The additional rules for specifying the relative orientations and positions among the groups help to partially compensate for the information loss caused by the decomposition.

Anchor marks can be employed, as described in copending application Ser. No. 11/317,768. However, the use of a hierarchical structure in the present application reduces the number of marks which provide a given detection accuracy, such that anchor marks are generally not needed.

The marks in the hierarchical security mark can be used, collectively or individually, to represent information. For example, one or more of the location(s), size(s), color(s) and/or shape(s) of the one or more data marks and/or their inter/intra group spatial relationships can designate the information contained therein. In this manner, information can be stored in and extracted from a HMSM configuration utilizing one or more algorithms. For example, the algorithms may comprise processing instructions which compare one or more of the location(s), size(s), color(s), shape(s) of the one or more data marks and/or their inter/intra group spatial relationships and/or number of groups embedded in a recipient with those of one or more stored values for HMSMs which are associated in memory with one or more stored parameters. The stored parameters may enable authentication of a document, e.g. by providing information identifying the document in which the HMSM is intended to be embedded, e.g.: a 10 dollar bill; a passport or other travel document issued in a particular year or from a particular issuing office; or identify the owner or source of the document. The stored parameters may identify whether the document may be copied, e.g., by identifying the document as a copyrighted document or a security document in which copying is limited in some way. Additional groups of marks may be provided to increase the amount of information. For example, all currency denominations may have a HMSM as exemplified in FIGS. 1 to 3. A fifth group of marks may be added to the four for denominations above a certain value.

Figure 5:
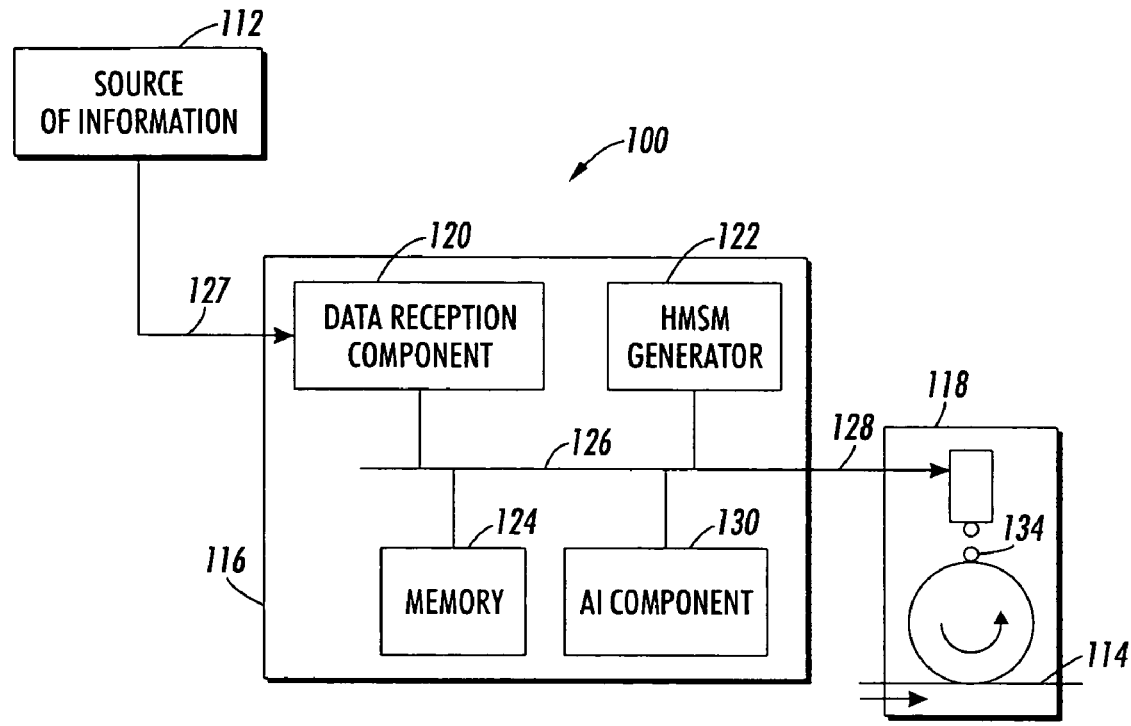
FIG. 5 is a functional block diagram of an exemplary embodiment of a system that applies a security mark to a recipient.

With reference to FIG. 5, an exemplary system 100 for generating and applying security marks to one or more recipients is illustrated. The illustrated system 100 includes a source of information 110 which supplies information 112 to be embedded in a recipient 114 to a generating component 116, which generates a HMSM in accordance with the information, and an application component 118, in communication with the MSM generation component, for embedding the generated HMSM in an image to be applied to recipient 114. The illustrated generating component 116 includes a data reception component 120, which receives the input information 112, a processing component 122, which executes instructions for generating a security mark based on the received information, and a memory 124 which stores the processing instructions, all interconnected by a data/control bus 126. It will be appreciated that two or more of these components may be combined or distributes as two or more separate components. For example memory 124 may be combined with processor 122 as a single chip. Memory 124 may include data reception component 120. The MSM generating component 116 may be any suitable computing device for processing and storing data, such as a general purpose computer or combination processor and memory device. In one embodiment, the MSM generating component 116 may form a part of a dedicated device, such as a printer 118.

The data reception component 120 can comprise memory for storing the information received from the source of information and may also store a set of rules for the security mark which are developed by the processor based on the information. The memory may represent any type of computer readable medium which incorporates alterable memory. The alterable memory, whether volatile or non-volatile, can be implemented by using any one or more of static or dynamic RAM, a floppy disk and disk drive, a writeable or rewriteable optical disk and disk drive, a hard drive, flash memory or the like. The data reception component 120 receives information data from one or more sources 110. Such sources can be one or more databases, processing components, etc. that contain information related to one or more products (e.g., currency, passports, visas, banking documents, identification documents, etc.), generally in machine readable form. Data received by the reception component 120 can be representative of substantially any desired quantity or quality such as origin of manufacture, date, time, serial number, currency value, combination thereof or simply an arbitrary alphanumeric string. In one embodiment, the data is proprietary and may be encoded such that only a limited number of users can interpret the data. Such information can be utilized to verify the authenticity of the recipient to which the security mark is applied.

The processing component 122 can be any suitable processing component which can convert received data into at least one hierarchical miniature security mark (HMSM) which is placed in a particular configuration. Suitable processing components are instantiated in general purpose computers or dedicated devices. Information from the data reception component 120 can be employed to generate one or more security marks. The marks that comprise an HMSM configuration can be composed via one or more algorithms stored in memory 124 that convert the received data to a set of rules governing permitted configurations of marks that are representative of the received data. Additionally, the processor may derive a set of permitted configurations which obey the rules. The algorithm can utilize one or more equations, methodologies, work flows, or the like to determine one or more of the locations, sizes and shapes of one or more marks in the HMSM. Such a determination can be made based at least in part upon one or more aspects of one or more disparate marks.

The algorithms can employ substantially any method to determine the location, size, shape, etc. of the marks within a prospective HMSM configuration. For example, key dependency, mathematical morphology, etc. can be employed. Algorithms utilizing mathematical morphology can process an image utilizing a structuring element, erosion and/or dilation, for example. Informed embedding can be employed utilizing blind extraction. In one example, various techniques are employed to create compact non-authentic regions and to remove noise due to high quality compression from a false detection map. Utilizing mathematical morphology, the tampered regions can be located and noise (e.g., from lossy compression, etc.) is reduced. In another embodiment, an algorithm that creates a geometrically invariant feature based security mark is created. Such a mark remains constant under rotation, scale, translation, etc.

The memory component 124 can store one or more algorithms, look up tables, or the like for generating a particular MSM configuration. New algorithms to be employed by the security mark generation component 116 can be transmitted to the memory component 124. In this manner, algorithms can be stored, viewed, edited, organized and retrieved for subsequent use. Selection of an algorithm can be based on a plurality of factors such as data source, user preference, time constraints, footprint constraints, data constraints, surface type, and the like.

The memory 124 may be implemented using any appropriate combination of alterable, volatile or non-volatile memory or non-alterable, or fixed, memory. The alterable memory, whether volatile or non-volatile, can be implemented by using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, and gaps in optical ROM disk, such as a CD ROM or DVD ROM disk and disk drive, or the like.

The source of information 112, HMSM generator 116, and application component 118 may be interconnected by links 127, 128 for communication therebetween. Suitable links include one or more of wired and wireless links, internet or intranet connections, or the like.

In order to determine an appropriate security mark generation algorithm, an artificial intelligence (AI) component 130 can be employed to select one or more appropriate algorithms from a set of available algorithms. In one aspect, the AI component 130 can employ information received from one or more sources (e.g., databases, processors, machine control systems, etc.) to determine an appropriate algorithm. In another aspect, one or more parameters can be detected and employed to determine an appropriate algorithm. In one exemplary embodiment, the appropriate algorithm can be determined by machine learning wherein one or more training sets of data with examples of desired results and/or undesired results for data format and/or processing techniques can be utilized to train the system. In another aspect, initial conditions, based on one or more features that indicate desired results, can be utilized. Such initial conditions can be adjusted over time and associated with returned results in order to improve discrimination.

The processor 116 may select one of the permitted HMSM configurations, based on the image to which is to be embedded. For example, the processor may apply one or more criteria to select a configuration which is machine-readable and yet which is visually unobtrusive in the recipient in which it is to be embedded.

The application component 118 can apply one or more security marks received from the security mark generation component 112 to one or more recipients. The application component 118 may include a printer or other device capable of rendering an image in a tangible medium or an electronic medium. In one example, the application component 118 is embodied in a printer that can place a MSM configuration on a physical recipient 114 (e.g., paper, velum, acetate, etc.) based at least in part upon commands received from the security mark generation component 116. In this manner, a mark applying component 132, such as a print head, ink jet, an applicator, photoconductive element of a xerographic device, or the like can and distribute a marking medium 134, such as ink or toner, in specified locations to create a particular MSM configuration. The mark applying component 132 may move to one or more locations relative to the recipient 122 during application of the HMSM. In another embodiment, the application component 116 comprises a laser marking system that removes and/or discolors a surface of the recipient in order to create a particular HMSM configuration. The security mark applying component 116 can be embodied in a conventional printer, such as an inkjet or xerographic printer which includes an image applying component which applies the HMSM as part of an image to be protected by the MSM. In general, a printer can comprise any device for rendering an image on print media, such as a copier, laser printer, bookmaking machine, facsimile machine, or a multifunction machine.

While particular reference is made to applying a security mark to a physical embodiment of a recipient, it is to be appreciated that the mark applying component 116 may apply the security mark to a digital image by embedding the MSM as data in the image data. For example, the image data can be transformed by changing gray levels corresponding to colorant values of pixels of the image. It is to be appreciated that the application component 116 can be substantially any device that can create one or more marks on a recipient.

Figure 6:
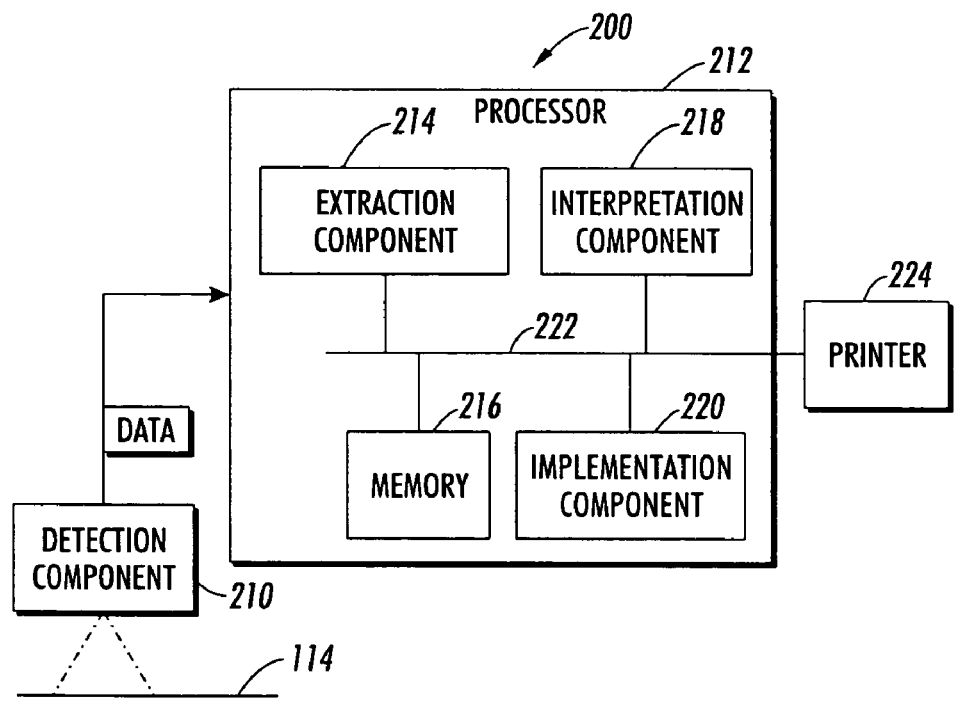
FIG. 6 is a functional block diagram of an exemplary embodiment of a system that detects, extracts and interprets data contained within a security mark.

FIG. 6 illustrates a system 200 that retrieves a security mark (e.g., an HMSM configuration) from a recipient, associates information with the security mark (i.e., interprets it), and may also invoke a computer implemented process based on the interpretation. The illustrated system 200 includes a detection component 210, and a processor 212 comprising an extraction component 214, a memory 216, which stores one or more algorithms, an interpretation component 218, and an optionally an implementation component 220 which implements a process based on information from the interpretation component 218. The processing components 214, 218, and 220 and memory may be connected by a data/control bus 222. The processor 212 may comprise a general purpose computer or may form a part of a dedicated device for implementing a specific computer implemented process, such as a banknote verification device, passport verification device, printer, or the like. The exemplary system 200 can detect one or more security marks that are applied to a recipient, extract the one or more security marks, and interpret the data contained within the one or more security marks, and optionally implement a process based on the interpretation. The memory 216 can store one or more algorithms utilized by the extraction component to extract the one or more security marks applied to the recipient and/or by the interpretation component for interpreting the extracted mark.

The detection component 210 can be employed to detect one or more security marks located on a recipient. A suitable detection component 210 may include an optical input device capable of capturing information from an entire document or from a localized region of a recipient, such as a part of a document, and generating a signal representative of the captured region, such as gray levels for pixels in the region. The detection component 210 may include a processing component which executes processing instructions for evaluating the signals. For example, the detection component may be preprogrammed such that it searches for particular configurations, specific locations, after a predetermined condition is met, and so forth. In this manner, the detection component 210 can be customized based on one or more user requirements. The detection component 210 can be substantially any device that can scan a recipient surface and locate one or more putative MSM configurations.

In one embodiment, the detection component 210 comprises an optical detection system that can scan a particular field utilizing a charge coupled device (CCD) array. One or more predetermined thresholds can be established related to one or more pixels within an array. Such array can be scrutinized such that pixels which meet the one or more predetermined thresholds (e.g., particular gray level, brightness, size, etc.) can be identified. The detection component 210 can process the identified pixels and determine whether a group of markings indicative of an MSM configuration is present. For example, the optical detection system can select a region of an image for analysis where an MSM is expected to be located, e.g., the optical detection system may zoom in on the surface of a bill of currency and detect the location of one or more security marks and the data contained therein.

The extraction component 214 can employ one or more algorithms to extract information contained within one or more security marks. Algorithms can contain one or more formulae, equations, methods, etc. to interpret data represented by a particular security mark. The extraction component 214 can analyze the location of the marks in a group relative to each other and relative to other groups of marks in the collection. The size, shape, color, orientation, etc. of the marks can also be analyzed to extract information contained within the one or more MSM configurations. In addition, the extraction component can analyze the location of any anchor marks relative to each other to insure that an MSM configuration exists in a particular location.

The memory 216 can be employed to store, organize, edit, view, and retrieve one or more algorithms for subsequent use. In one aspect, the extraction component 214 can retrieve one or more algorithms from the memory 216 to determine the information contained within a MSM configuration. In another aspect, the extraction component 214 can determine the appropriate algorithm, methodology, etc. to extract information from one or more security marks and transmit such information to the memory 216 for subsequent use.

The interpretation component 218 can determine the meaning of data extracted from one or more putative security marks by the extraction component 214. Such a determination can be made based on one or more conditions such as the location of the security mark, the recipient upon which the security mark is applied, the location of the system, one or more predetermined conditions, and the like. In addition, a look up table, a database, etc. can be employed by the interpretation component 218 to determine the meaning of data extracted from a security mark. In one example, the security mark is related to the recipient upon which the security mark is applied. For instance, a security mark which corresponds to a data string "5jrwm38f6ho" may have a different meaning when applied to a one hundred dollar bill versus a one hundred euro bill.

In one embodiment, the interpretation component 218 compares information derived from the security mark with other information concerning the recipient. The information concerning the recipient may be stored on memory and/or may be extracted from the recipient. For example, the detection component may detect that the recipient comprises an image of a one hundred dollar bill or this information may be input by an operator of the system. The interpretation component may determine, from the look up table, whether information derived from the security mark properly corresponds to a one hundred dollar bill.

The implementation component 220 can automatically implement a computer implemented process based on information from the interpretation component. For example, if the interpretation component 218 determines that there is no security mark or collection of marks corresponding to a one hundred dollar bill on the recipient, the implementation component 220 may send a signal to an associated device, cause an alarm to sound, generate data indicating that the bill is suspected of being counterfeit, or other process based on the interpretation. For example, when the presence of a particular security mark is detected which is interpreted as indicative of a copyrighted document, the implementation component 220 signals an associated printer 224 which may prevent copying of the document on the printer.

Figure 7:
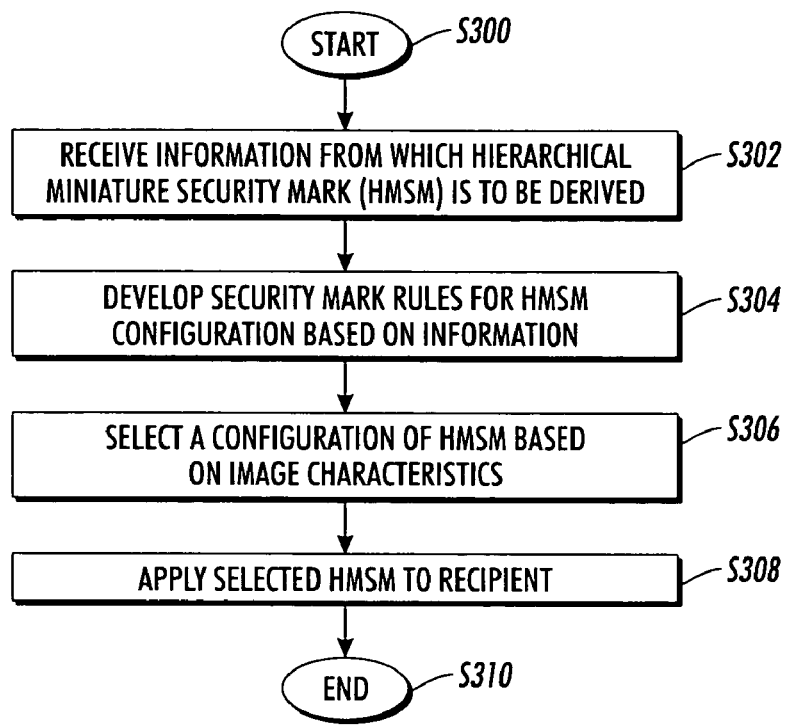

FIG. 7 illustrates a method of generating a security mark which may be performed using the system illustrated in FIG. 6. The method is described as a series of steps. However, it is to be appreciated that the method may comprise fewer, more, or different steps and that the steps need not be performed in the order illustrated. The method begins at step S300. At step S302, information is received from one or more sources. Such information can contain data pertaining to source, date, time, serial number, sequential code, etc. In one example, the information is a proprietary alphanumeric sequence that is known only to a limited number of parties. At Step S304, security mark rules are developed which permit a plurality of HMSM configurations for a security mark, based at least in part upon the information received at step S302. In one example, the security mark rules/configurations can be generated utilizing one or more algorithms that can determine the size, shape, color, orientation and location of the marks and groups of marks according to first and second level hierarchical rules. The algorithm may be selected based on the information received in step S302. At step S306 one of the permitted configurations is selected based on based on predetermined selection criteria, including criteria based on characteristics of the image into which it is to be embedded. The characteristics may include, for example, the morphology (color, shape, size, etc.) and locations of suitable areas 14 and/or unsuitable areas 16 in the region of the image to which the security mark is to be embedded.

At step S308, the security mark is applied to a recipient. Application of the security mark can be accomplished utilizing substantially any device such as a printing platform, a laser marker, a pin stamp marker, etc. In addition, substantially any methodology such as xerography, printing, image transfer, etc. can be employed to apply the security mark to a recipient, such as paper. Alternatively, step S308 may comprise simply embedding the security mark in a digital image. The method ends at step S310.

Figure 8:
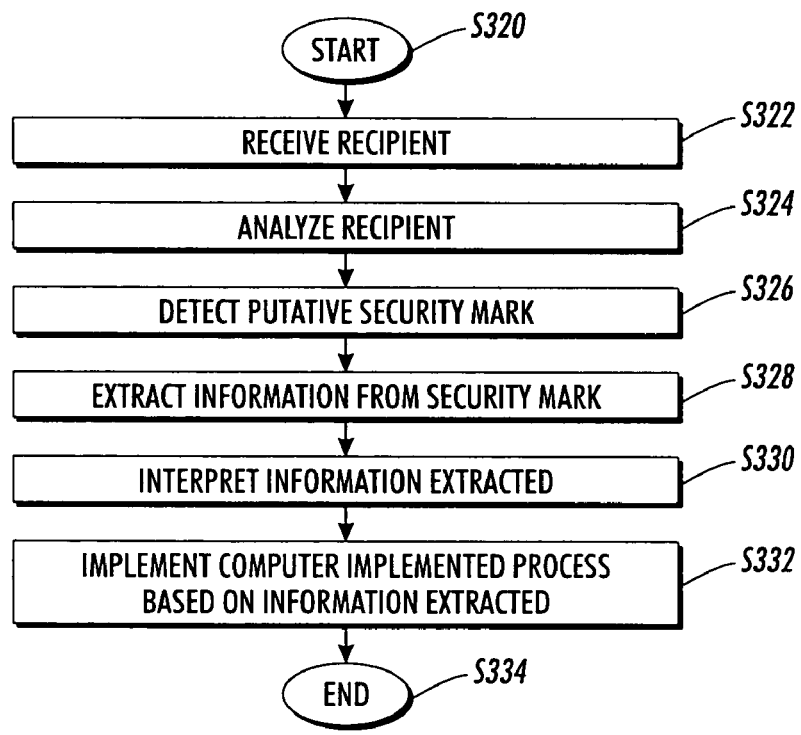
FIG. 8 is a flow chart illustrating an exemplary method of extracting information from a security mark.

FIG. 8 illustrates a detection method, which may occur at some time subsequent to step S308. The method of FIG. 8 may be performed on the recipient marked with the security mark described above in FIG. 7 or on a document which has a different security mark or no security mark. The method starts at step S320. At step S322, a recipient which may or may not comprise a security mark is received.

At step S324, the recipient is analyzed. This analysis can determine the context wherein a security mark may be employed. For example, the type of recipient, the location of the analysis, the material that comprises the recipient, text and/or images placed on the recipient, etc. can be determined. In one example, the same security mark may have different meanings related to the recipient upon which it is placed.

At Step S326, a putative security mark, where present, may be detected. Detection can be performed, in part, by a number of methods such as those using optical systems, including video systems, and/or human detection. In this manner, the location, size, orientation, etc. of the security mark can be determined. In one embodiment step S326 includes examination of pixels in a region of an image where a security mark, where present, should be located and determining whether any of those pixels singly or in combination have grey levels which generally correspond to marks of a security mark.

At Step S328, the putative security mark (e.g., a collection of marks which may correspond to a security mark) is extracted to determine the data contained therein. Extraction of the security mark can be accomplished by one or more algorithms, formulae, equations, methods, etc. to interpret data represented by a particular security mark. In one example, the security mark includes a HMSM configuration wherein data conforms to one or more hierarchical rules. As part of the extraction, analysis can be performed to determine the location of the data marks relative to each other and the relationship(s) between groups of marks. The size, shape, color, orientation, etc. of the marks can also be analyzed to extract information contained within the one or more HMSM configurations. In this step, different configurations of the same HMSM are considered to be identical and thus to represent identical information.

At Step S330, the information extracted from the putative security mark is interpreted. In particular, once information has been extracted from the security mark, it is interpreted to determine its meaning. Such interpretation can be contextual, as the same information extracted from various disparate contexts can have different meanings. In one example, the same alphanumeric string extracted from a security mark on a passport can have a different meaning than on a bill of currency. Once data is interpreted, it can be output for further processing.

At step S332, a computer implemented process may be implemented based on the interpretation made at step S330. The method ends at step S332.

In one exemplary embodiment, HMSMs are embedded in paper documents that are to be protected. When the documents are scanned, processed, and sent to a printer, the MSM detectors in the imaging system may recognize the embedded HMSM marks and defeat attempts to copy.

The exemplary embodiment has advantages in that it enables a relatively small number of marks to be inobtrusively disposed in a document and detected with high levels of accuracy using relatively simple and inexpensive detectors.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for generating a security mark comprising:
 a data reception component that receives information;
 a security mark generation component in communication with the data reception component that generates at least one security mark configuration based at least in part upon the received information, the security mark configuration comprising a plurality of marks; and
 an application component that applies one configuration of the at least one security mark configuration to a recipient, the applied security mark configuration obeying a predetermined set of rules which include at least a first rule which defines a spatial relationship between a first group of the plurality of marks and at least a second group of the plurality of marks, spaced from the first group of marks by a number of pixels, and at least a second rule which defines a spatial relationship between marks within each of the first and second groups, whereby the first and second groups have an identical spatial configuration.

2. The system of claim 1, wherein each of the first and at least second groups of marks comprises at least three marks.

3. The system of claim 2, wherein each of the at least three marks in the first and at least second groups of marks is identical in at least one of size, shape, and color to the others of the at least three marks.

4. The system of claim 1, wherein the first rule defines a permitted spacing between groups of marks as a function of a fixed spacing.

5. The system of claim 4, wherein the first rule defines a permitted spacing between groups of marks as a function of a fixed spacing in two mutually perpendicular directions.

6. The system of claim 4, wherein a spacing between groups is a function of a fixed number of pixels, the fixed number being at least 10 pixels.

7. The system of claim 1, wherein the application component applies the security mark with at least one of printing, engraving, embossing, discoloration and material removal of the recipient.

8. The system of claim 1, further comprising a memory component which stores instructions for generating the at least one security mark configuration, based on received information and wherein the generation component executes the instructions.

9. The system of claim 8, wherein the memory stores a plurality of sets of rules for generation of security marks, and wherein the security mark generation component selects one of the plurality of sets of rules based on the information received.

10. The system of claim 1, wherein the information received is representative of at least one of an origin of manufacture, a date, a time, a serial number, and an alphanumeric string.

11. The system of claim 1, wherein the security mark configuration comprises miniature security marks.

12. The system of claim 11, wherein the miniature security marks applied to the recipient are visually unobtrusive.

13. The system of claim 1, wherein there are at least three groups of marks.

14. The system of claim 1, wherein a minimum distance between a mark of the first group and a mark of the second group is greater than a maximum distance between two marks within the same group.

15. The system of claim 1, wherein a space between each pair of marks in each group of marks exceeds a size of a mark by a factor of at least 2.

16. A system for generating a security mark comprising:
 a data reception component that receives information;
 a security mark generation component in communication with the data reception component that generates a plurality of security mark configurations based at least in part upon the received information, the security mark configurations each comprising a plurality of marks; and
 an application component that applies one security mark configuration of the plurality of security mark configurations to a recipient including an image, the applied security mark configuration obeying a predetermined set of rules which include:
  at least one rule which, for at least three groups of the plurality of marks, each group comprising at least three marks, defines a spatial relationship between a first of the at least three groups of marks and at least a second of the at least three groups of marks, whereby the at least three groups of marks are not overlapping each other, and
  a second rule which defines a spatial relationship between at least three marks within each of the at least three groups, whereby a first and a second of the at least three marks subtend the same angle α from a third of the at least three marks,
 the predetermined set of rules being obeyed by the plurality of security mark configurations, the generation component selecting, from the plurality of configurations, one of the plurality of configurations based on predetermined selection criteria which include determining an area of the image which is of an acceptable level of image smoothness for detection of the security mark.

17. The system of claim 16, wherein the recipient comprises an image and at least one of the selection criteria is based on characteristics of the image.

18. A method for applying a security mark to a recipient comprising:

generating at least one security mark configuration representative of information to be applied to a recipient, the at least one security mark configuration comprising a plurality of marks arranged in at least three non-overlapping groups of at least three marks, which obey rules which provide a limited flexibility in the positioning of the at least three groups of the marks, wherein the applied security mark configuration obeys a predetermined set of rules which include at least first rule which defines a spatial relationship between a first of the groups of the plurality of marks and a second of the groups of the plurality of marks and a second rule which specifies, for each of the at least three groups of the marks, at least one of a) a distance function between first and second marks in the group and b) an angle $\alpha$ subtended by two of the marks from a third of the marks in the group; and applying one security mark configuration of the at least one security mark configuration to a recipient.

19. A computer readable medium comprising instructions for performing the method of claim 18.

20. A recipient comprising a physical document formed on a physical medium which includes a security mark applied with a marking material by the method of claim 18.

21. A recipient comprising a physical document formed on a print medium which includes an image and a machine readable security mark embedded within the image, the security mark comprising a collection of miniature marks including at least three groups of marks, each of the groups including the same number of marks, the groups of marks each including marks which obey predefined identical intra-group spatial relationships, the groups of marks obeying at least one predefined inter-group spatial relationship which permits a limited number of different spatial configurations of the groups of marks.

22. A method for detecting a security mark comprises:
inputting image data;
processing at least a portion of the image data to identify a collection of marks which potentially comprises a security mark;
with a computer processor, subjecting the image data to a predetermined set of rules for the security mark including at least one first rule which defines a spatial relationship between first and second groups of marks in a collection of the marks and at least one second rule which defines intra-group spatial relationships between marks in each group; and where the image data meets the predetermined set of rules, optionally implementing a computer implemented process.

23. A computer readable medium comprising instructions for performing the method of claim 22.

24. A system for detection of security marks comprising:
a detection component for generating a signal representative of image data;
an extraction component for extracting from the image data a security mark where present, the security mark comprising a collection of marks;
an interpretation component for interpreting the extracted security mark, the interpretation component interpreting a plurality of different configurations of the security mark in the same manner, each of the configurations obeying a predetermined set of rules which define spatial relationships between marks in first and second groups of the marks and at least one spatial relationship between the first and second groups of the marks; and
optionally, an implementation component for implementing a computer implemented process in accordance with the interpretation.

25. The system of claim 24, wherein the first group of marks and the second group of marks obeys a first set of rules which define inter-group spatial relationships between groups of marks, the first group of marks obeying a second set of rules which defines intra-group spatial relationships between marks in a group, the at least second group of marks obeying the second set of rules.

26. The system of claim 25, wherein the second group of marks comprises at least two second groups of marks.

* * * * *